United States Patent
Bian et al.

(10) Patent No.: US 12,359,021 B1
(45) Date of Patent: Jul. 15, 2025

(54) HIGH-VISCOSITY PBT POLYMERIZATION REACTOR AND METHOD FOR PREPARING DIRECT MELT-SPUN HIGH-VISCOSITY PBT/LOW-VISCOSITY PET TWO-COMPONENT ELASTIC FIBER

(71) Applicant: JIANGSU GANGHONG FIBER CO., LTD., Suzhou (CN)

(72) Inventors: Shuchang Bian, Suzhou (CN); Rui Wang, Suzhou (CN)

(73) Assignee: JIANGSU GANGHONG FIBER CO., LTD., Suzhou (CN)

( * ) Notice: Subject to any disclaimer, the term of this patent is extended or adjusted under 35 U.S.C. 154(b) by 0 days.

(21) Appl. No.: 18/956,721

(22) Filed: Nov. 22, 2024

Related U.S. Application Data

(63) Continuation-in-part of application No. PCT/CN2024/093558, filed on May 16, 2024.

(30) Foreign Application Priority Data

Jan. 12, 2024 (CN) .......................... 202410046154.8

(51) Int. Cl.
  *C08G 63/78* (2006.01)
  *C08G 63/183* (2006.01)
  (Continued)

(52) U.S. Cl.
  CPC ......... *C08G 63/785* (2013.01); *C08G 63/183* (2013.01); *D01D 5/32* (2013.01); *D01F 8/14* (2013.01)

(58) Field of Classification Search
  USPC ................ 428/374, 480; 442/362; 528/308.8
  See application file for complete search history.

(56) References Cited

U.S. PATENT DOCUMENTS 6,762,235 B2 * 7/2004 Takenaka ............. C08G 63/183
528/308.8

FOREIGN PATENT DOCUMENTS

| CN | 101126180 A | 2/2008 |
|---|---|---|
| CN | 101851812 A | 10/2010 |

(Continued)

OTHER PUBLICATIONS

Machine-generated English language translation of Detailed Description of WO 2021/135080 A1, 17 pages, retrieved from ESPACENET on Feb. 26, 2025. (Year: 2021).*

*Primary Examiner* — Fred M Teskin
(74) *Attorney, Agent, or Firm* — Dinsmore & Shohl LLP

(57) ABSTRACT

The present disclosure relates to a high-viscosity PBT polymerization reactor and a method for preparing direct melt-spun high-viscosity PBT/low-viscosity PET two-component elastic fiber. The polymerization reactor is provided with two parallel shafts, a plurality of disc reactors is disposed on the two shafts, and a plurality of homogenizers is arranged at intervals on an outer edge of a disc combination along its circumferential direction in the low viscosity zone. When preparing the two-component elastic fiber, two production lines are used to produce a high-viscosity PBT melt and a low-viscosity PET melt, respectively, and then spinning. The high-viscosity PBT production line comprises a first esterification reactor, a second esterification reactor, a first prepolymerization reactor, a second prepolymerization reactor, and a high-viscosity PBT polymerization reactor. By using this method, the cost is low and the production capacity is high, the process flow is shortened, and the elastic fiber has good properties.

19 Claims, 3 Drawing Sheets

(51) Int. Cl.
*D01D 5/32* (2006.01)
*D01F 8/14* (2006.01)

(56) References Cited

FOREIGN PATENT DOCUMENTS

| | | |
|---|---|---|
| CN | 104894688 A | 9/2015 |
| CN | 106337212 A | 1/2017 |
| CN | 107964690 A | 4/2018 |
| CN | 111100278 A | 5/2020 |
| CN | 111101237 A | 5/2020 |
| CN | 111701553 A | 9/2020 |
| CN | 111705370 A | 9/2020 |
| CN | 115613159 A | 1/2023 |
| CN | 116949600 A | 10/2023 |
| CN | 117626476 A | 3/2024 |
| WO | WO 2021/135080 A1 * | 7/2021 ............... D01D 5/32 |

* cited by examiner

HIGH-VISCOSITY PBT POLYMERIZATION REACTOR AND METHOD FOR PREPARING DIRECT MELT-SPUN HIGH-VISCOSITY PBT/LOW-VISCOSITY PET TWO-COMPONENT ELASTIC FIBER

CROSS-REFERENCE TO RELATED APPLICATIONS

This application is a Continuation-in-Part of PCT App. Serial No. PCT/CN2024/093558, having an International Filing Date of May 16, 2024, which claims the benefit of priority to Chinese Patent Application No. 202410046154.8 filed on Jan. 12, 2024, and the entire disclosure of both are hereby incorporated by reference.

TECHNICAL FIELD OF THE INVENTION

The present disclosure relates to a high-viscosity PBT polymerization reactor and a method for preparing direct melt-spun high-viscosity PBT/low-viscosity PET two-component elastic fiber.

BACKGROUND OF THE INVENTION

The application scope of elastic fibers in the modern chemical fiber industry is becoming increasingly wide, especially in recent years, with the rapid development of two-component elastic fiber theory, there has been a deeper understanding of the forming mechanism and elasticity generation mechanism of parallel two-component elastic fibers, and the variety of elastic fibers have also made significant progress compared to the original technology. At the beginning of the 1970s, DuPont first launched the single-component elastic fiber spandex, which quickly became popular in the market with its unique style and characteristics, and in the late 1970s, they also launched the parallel two-component elastic fiber T800, which uses PBT/PET parallel composite to produce good elastic effects, however, due to the low glass transition temperature of PBT components (26~42° C.), PBT/PET elastic fibers exhibit rapid crystallization characteristic under stress, and the T800 fiber has poor elastic recovery rate and shape retention; entering the 21st century, with the successful industrialization of chemical and biological fermentation methods for PDO, PTT polyester has attracted attention for its unique molecular structure and excellent elastic recovery performance, DuPont T400, a PTT/PET two-component elastic fiber, has been launched, the PTT/PET two-component parallel composite fiber has excellent elastic recovery rate and shape retention, and will not deform after repeated stretching, its elastic slow-release effect overcomes the bound feeling of the elastic fiber spandex, and it has become the best elastic fiber variety in the fabric industry with its characteristics such as excellent resistance to chlorine bleaching and light exposure.

The development of two-component elastic fibers has become a key area of industry development in the past decade, the latest progress is to take advantage of the different orientation and crystallization behavior between PET polyester components with different viscosities, and during the spinning process, the high-viscosity component and the low-viscosity component exhibit elastic curls due to the different speed and percentage of transition from the orientation state to the crystalline state, forming a spring-like structure, thus exhibiting good elastic effect on the fabric. Patents CN111101237A, CN101126180A, CN106337212A, CN107964690A, CN101851812A, CN115613159A, etc., respectively disclose a series of parallel composite elastic fibers such as PET/PET, PBT/PET, PTT/PET and preparation methods thereof, and methods of preparing easily or deeply dyed elastic fibers using modified PET with elastic retention, such as high-viscosity ECDP, high-viscosity high-shrinkage polyester, high-viscosity polyester easily dyed by disperse dye, high-viscosity CDP cationic polyester, etc., and low-viscosity PET polyester. The above-mentioned preparation methods of the elastic fibers are based on the production process of chip spinning of high-viscosity chips and low-viscosity chips respectively through pre-crystallization, melting of drying screw, to composite spinning and composite parallel spinneret forming, although the basic problems of parallel composite spinning technology are solved, chip spinning technology has obvious defects such as long process, high cost, low production capacity, and poor product quality stability.

PBT/PET two-component composite elastic fibers have the characteristics of moderate elasticity, low price, and good clothing comfort, their cost is only half of that of PTT/PET two-component fibers, their crimp shrinkage rate is significantly higher than that of PET/PET composite elastic fibers, combined with their stress relief effect, they have good market application scope, and although their crimp stability is not as good as PTT/PET elastic fibers, their stability can meet the requirements of rapid fashion turnover and use, therefore, PBT/PET two-component fibers have broad application scope. However, the crimp shrinkage rate, crimp stability, and quality stability of PBT/PET two-component fibers in the existing technology are not high enough, and there is still a lot of room for improvement. When synthesizing PBT, a large amount of tetrahydrofuran byproduct is generated in the polymerization system due to the cyclo-dehydration of raw material 1,4-butanediol, and this byproduct has a significant impact on the polymerization system and the resulting product PBT, so how to control the content of tetrahydrofuran byproduct is a difficult point in the PBT synthesis process.

SUMMARY OF THE INVENTION

A purpose of the present disclosure is to provide a high-viscosity PBT polymerization reactor for preparing a high-viscosity PBT melt, and the high-viscosity PBT melt prepared using the polymerization reactor has high viscosity, and can significantly improve the fiber properties when used for preparing a direct melt-spun high-viscosity PBT/low-viscosity PET two-component elastic fiber.

Another purpose of the present disclosure is to provide a direct melt-spun high-viscosity PBT/low-viscosity PET two-component elastic fiber, of which the crimp shrinkage rate, crimp stability, and quality stability are significantly improved.

Still another purpose of the present disclosure is to provide a method for preparing a direct melt-spun high-viscosity PBT/low-viscosity PET two-component elastic fiber, the preparation method has significantly reduced cost, high production capacity, and greatly shortened process, and the crimp shrinkage rate, crimp stability, and quality stability of the elastic fiber prepared by this method are significantly improved.

To achieve the above purpose, a technical solution employed by the present disclosure is:

A high-viscosity PBT polymerization reactor, is used to prepare a high-viscosity PBT melt for preparing a high-viscosity PBT/low-viscosity PET two-component elastic fiber, the high-viscosity PBT polymerization reactor is a horizontal polymerization reactor, and comprises a main body containing a chamber internally, the main body comprises a low viscosity zone, a med-high viscosity zone, and a high viscosity zone arranged in sequence along the axial direction of the high-viscosity PBT polymerization reactor, the viscosity of the PBT melt in the low viscosity zone, the med-high viscosity zone and the high viscosity zone increases in sequence; the high-viscosity PBT polymerization reactor further comprises two agitating shafts, one of which is disposed in the low viscosity zone and part of the med-high viscosity zone, and the other one is disposed in the high viscosity zone and the remaining med-high viscosity zone; a plurality of disc reactors is disposed on each of the agitating shafts, and the disc reactors in the low viscosity zone are three- to ten-disc combination; the disc reactors in the med-high viscosity zone are two-disc combination; the disc reactors in the high viscosity zone are single-disc; a plurality of homogenizers is arranged at intervals on an outer edge of each disc combination along its circumferential direction in the low viscosity zone of the high-viscosity PBT polymerization reactor, and the homogenizers extend along the axial direction of the high-viscosity PBT polymerization reactor and are used to pour the PBT melt in the low viscosity zone onto the surfaces of the disc reactors.

By adopting this configuration, the devolatilization efficiency in the low viscosity zone (front chamber) may be improved by up to 20% to 35%, with the equal of the intrinsic viscosity at the entrance position of the high viscosity zone in the med-high viscosity zone and the high viscosity zone (rear chamber), the length of the front chamber may be shortened by 18% to 28% compared to conventional disc reactors, the total volume of the high-viscosity PBT polymerization reactor may be reduced by 15% to 20%, the residence time of materials may be reduced by 15% to 20%, the material may be mixed more uniformly, and the product quality may be effectively improved.

In the present disclosure, a disc combination means that two or more adjacent disc reactors are fixedly connected together to form the disc combination. The disc reactors may adopt a conventional disc reactor used in polyester synthesis, for example, a disc reactor comprises a middle hollow part with a circular shape and a ring-shaped reactor part on the outer edge of the hollow part, and the reactor part is provided with a plurality of sieve holes.

In some implementations, the cross-section of the homogenizers is in a wedge shape; the thick end of the wedge is oriented towards the direction of rotation of the disc reactors.

In some implementations, there are 8 to 12 homogenizers.

In some implementations, the homogenizers are uniformly distributed along the circumferential direction of the disc reactors.

By adopting the above-mentioned homogenizer configuration, and combining with a special melt material flow channel design, the present disclosure can enhance the mixing effect in the bottom material area, push more materials to higher positions along the rotation direction, increase the residence time of materials on the disc reactors, and improve the volatilization efficiency of the disc reactors.

In some implementations, the total number of disc reactors in the low viscosity zone is 25 to 35, the total number of disc reactors in the med-high viscosity zone and the high viscosity zone is 20 to 30, and the total number of disc reactors in the high viscosity zone is 8 to 12.

In some implementations, the length of the low viscosity zone is half of the length of the high-viscosity PBT polymerization reactor, and the total length of the med-high viscosity zone and the high viscosity zone is half of the length of the high-viscosity PBT polymerization reactor; the ratio of the length of the med-high viscosity zone to that of the high viscosity zone is 2:1.

In some implementations, the length of the agitating shaft disposed in the low viscosity zone and part of the med-high viscosity zone is two thirds of the length of the high-viscosity PBT polymerization reactor, and the length of the agitating shaft disposed in the high viscosity zone and the remaining med-high viscosity zone is one third of the length of the high-viscosity PBT polymerization reactor.

In the present disclosure, half, two thirds, and one third are not exact mathematical values of half, two thirds, and one third, but refer to values approximately or around half, two thirds, one third, and roughly equal to half, two thirds, and one third.

In some implementations, the high-viscosity PBT polymerization reactor further comprises a prepolymer inlet located at the bottom of the front end of the low viscosity zone and a high-viscosity PBT melt outlet located at the bottom of the rear end of the high viscosity zone, wherein the high-viscosity PBT melt outlet is trumpet-shaped.

In some implementations, in the two-disc combination of the med-high viscosity zone, the distances between the disc combinations and between their two discs in each combination gradually increases from front to rear; the diameter of the disc reactors in the high viscosity zone decreases from front to rear, and the diameter of the last disc reactor in the high viscosity zone is 88%-92% of the diameter of the first disc reactor in the high viscosity zone; the high viscosity zone is further provided with a composite scraper, which comprises an axial scraper for scraping off the melt on the agitating shaft, a wall scraper for scraping off the melt on the inner wall of the high-viscosity PBT polymerization reactor, a disc scraper for scraping off the melt on the disc reactors, and a bottom scraper, the disc scraper being arranged in two layers and controlling the thickness of the material on the disc reactors to not exceed 30 mm. By adopting the scraper arrangement, it is possible to break the film of high-viscosity materials on the discs and mix them well with fresh low-viscosity materials. One layer in the disc scraper ensures effective separation of high-viscosity materials, while the other layer controls the thickness of the disc material, which can effectively control the effective separation of high-viscosity melt after being scraped by the scraper, and control the material thickness on the disc reactors to not exceed 30 mm, preferably be 10-30 mm.

In some embodiments, the length-to-diameter ratio of the high-viscosity PBT polymerization reactor is (3.0~3.6): 1.0, this high length-to-diameter ratio is beneficial for distributing more disc reactors to increase the effective devolatilization area, improve the vacuum degree of the reactor, and achieve the goal of increasing the viscosity of PBT melt and reducing the level of side reactions, and can also be combined with high vacuum design to quickly increase the viscosity of the high-viscosity PBT melt.

In some embodiments, the agitating shafts are respectively fixed on fixed seats at a front end and a tail end of the high-viscosity PBT polymerization reactor, in addition, a supporting seat can be fixedly disposed on the inner wall of the main body in the middle of the polymerization reactor for supporting the two agitating shafts. A rear end of the agitating shaft disposed in the low viscosity zone and part of the med-high viscosity zone is fixed on the supporting seat, and the front end of the agitating shaft disposed in the high viscosity zone and the remaining med-high viscosity zone is fixed on the supporting seat.

The present disclosure provides a method for preparing a high-viscosity PBT/low-viscosity PET two-component elastic fiber using the aforementioned high-viscosity PBT polymerization reactor, the two-component elastic fiber contains a high-viscosity PBT component and a low-viscosity PET component, and the viscosity of the high-viscosity PBT component is greater than that of the low-viscosity PET component, and the preparation method comprises steps of preparing a high-viscosity PBT melt and a low-viscosity PET melt separately, and spinning the high-viscosity PBT melt and the low-viscosity PET melt through the same parallel composite spinning assembly to obtain the two-component elastic fiber; the viscosity of the high-viscosity PBT melt is greater than the viscosity of the low-viscosity PET melt; the step of preparing a high-viscosity PBT melt comprises sequentially passing terephthalic acid and 1,4-butanediol through a first esterification reactor and a second esterification reactor for esterification reactions, through a first prepolymerization reactor and a second prepolymerization reactor for prepolymerization reactions to give a PBT prepolymer, and polymerizing the PBT prepolymer in the aforementioned high-viscosity PBT polymerization reactor to obtain the high-viscosity PBT melt; the step of preparing low-viscosity PET melt comprises sequentially passing terephthalic acid and ethylene glycol through a first esterification reactor and a second esterification reactor for esterification reactions, through a first prepolymerization reactor and a second prepolymerization reactor for prepolymerization reactions to give a PET prepolymer, and polymerizing the PET prepolymer in a low-viscosity PET final polymerization reactor to obtain the low-viscosity PET melt.

In the present disclosure, PBT refers to poly(1,4-butylene terephthalate), and PET refers to polyethylene terephthalate.

The high-viscosity PBT/low-viscosity PET two-component elastic fiber of the present disclosure has two components namely a high-viscosity component and a low-viscosity component. The method for preparing high-viscosity PBT/low-viscosity PET two-component elastic fiber is a melt direct spinning method, that is, directly using the polymerized melt for spinning, without going through the steps of cooling and chipping the melt, and then melting it for spinning.

In some implementations, the two-component elastic fiber contains 30%-70% of high-viscosity PBT component and 70%-30% of low-viscosity PET component.

In some implementations, the high-viscosity PBT melt has an intrinsic viscosity of 0.98~1.20, and a dynamic viscosity of 225~615 Pa·s; the low-viscosity PET melt has an intrinsic viscosity of 0.45~0.55, and a dynamic viscosity of 90~240 Pa·s.

In some implementations, the high-viscosity PBT melt has an intrinsic viscosity of 0.95~1.10, and a dynamic viscosity of 430~900 Pa·s.

In some implementations, the high-viscosity PBT melt has an intrinsic viscosity of 0.97~1.05, and a dynamic viscosity of 500~750 Pa·s.

In some implementations, in the same parallel composite spinning assembly, the high-viscosity PBT melt has a dynamic viscosity of 200~520 Pa·s, and the low-viscosity PET melt has a dynamic viscosity of 70~220 Pa·s. It can be seen that the high-viscosity PBT melt of the present disclosure has relatively small viscosity drop when transported to the spinning assembly.

In the present disclosure, the intrinsic viscosity is measured in a mixed solvent of phenol and tetrachloroethane in a volume ratio of 3:2.

In some implementations, when preparing the high-viscosity PBT melt, the preparation method further comprises a step of adding an esterification catalyst to the first esterification reactor before carrying out the esterification reaction, wherein the esterification catalyst is selected from the group consisting of tetrabutyl titanate, tetraisopropyl titanate, and tetra (2-ethylhexyloxy) titanate. Tetra (2-ethylhexoxy) titanate is preferred, which is not easily hydrolyzed, more stable, and conducive to the stable polymerization of PBT.

In some implementations, the esterification reaction in the first esterification reactor used for preparing the high-viscosity PBT melt is carried out at a pressure of 40~60 kPa.

In some implementations, the esterification reaction in the second esterification reactor used for preparing the high-viscosity PBT melt is carried out at atmospheric pressure.

In some implementations, the second esterification reactor used for preparing the high-viscosity PBT melt is a horizontal reactor and comprises three compartments arranged in sequence from front to rear, and when preparing the high-viscosity PBT melt, the preparation method further comprises a step of adding a side reaction inhibitor to the first compartment from front to rear of the second esterification reactor, the side reaction inhibitor is a Lewis base.

In some implementations, the Lewis base is selected from the group consisting of triethanolamine, quaternary ammonium salts, ethylenediaminetetraacetic acid, sodium acetate, sodium benzoate, sodium formate, potassium succinate, lithium acetate, zinc acetate, and combinations thereof.

In some implementations, the mass of the Lewis base is 30~300 ppm of the mass of the high-viscosity PBT melt.

In some implementations, the mass of the Lewis base is 75~240 ppm of the mass of the high-viscosity PBT melt.

In some implementations, the mass of the Lewis base is 100~160 ppm of the mass of the high-viscosity PBT melt.

In some implementations, the first esterification reactor and the second esterification reactor used for preparing the high-viscosity PBT melt are both provided with distillation columns at their upper ends, and the preparation method further comprises steps of extracting a mixture of water and tetrahydrofuran from the top of the two distillation columns, and extracting 1, 4-butanediol from column kettles.

Preferably, the preparation method further comprises a step of separating the mixture of water and tetrahydrofuran through three-column distillation to obtain pure tetrahydrofuran.

Preferably, the preparation method further comprises a step of recovering the extracted 1, 4-butanediol.

Preferably, the material of the distillation column is SUS316L.

The process column arranged on the first esterification reactor of the present disclosure adopts a pressure reducing design, the first esterification reactor is a reduced-pressure esterification reactor, with its operating pressure being controlled at 40~60 kPa (absolute pressure), the top of the column is provided with a by-product reflux system, an extraction system (water from the esterification reaction+ tetrahydrofuran), and a liquid ring vacuum pump, the second esterification reactor is of a multi-chamber and atmospheric-pressure design, and is designed to have a separate distillation column, a side reaction inhibitor, a Lewis base, is injected into the first compartment of the second esterification reactor, its function is to improve the pH environment in the second esterification reactor under weakly acidic conditions, suppress the degree of etherification reaction of the raw material 1, 4-butanediol to produce tetrahydrofuran, and the comprehensive effect can effectively reduce the production of tetrahydrofuran by 15% to 20%.

In some implementations, the first esterification reactor and the second esterification reactor used for preparing the high-viscosity PBT melt are both provided with distillation columns at their upper ends, and the preparation method further comprises a step of extracting and recovering 1, 4-butanediol from kettles of the distillation columns. The recovery may be carried out using a special recovery device. After the recovery, the impurities in 1, 4-butanediol are removed to refine, the refined 1, 4-butanediol may be re-added to the raw material pulping system for subsequent esterification and polymerization.

Preferably, the distillation column at the upper end of the second esterification reactor is disposed in the third compartment from front to rear of the second esterification reactor.

In some implementations, the PBT prepolymer introduced into the high-viscosity PBT polymerization reactor has an intrinsic viscosity of 0.280~0.350.

In some implementations, the PBT prepolymer introduced into the high-viscosity PBT polymerization reactor has an intrinsic viscosity of 0.290~0.325.

In some implementations, the PBT prepolymer introduced into the high-viscosity PBT polymerization reactor has an intrinsic viscosity of 0.295~0.310.

In some implementations, when preparing the high-viscosity PBT melt, the preparation method further comprises a step of injecting a polymerization catalyst to the third compartment from front to rear of the second esterification reactor.

In some implementations, the polymerization catalyst is prepared by reacting a titanate with a protonic acid under anhydrous conditions, removing alcohol by-products, and dissolving the reaction system in 1, 4-butanediol.

In some implementations, the titanate is selected from the group consisting of tetrabutyl titanate, tetraisopropyl titanate, and tetra (2-ethylhexyloxy) titanate.

In some implementations, the protonic acid is selected from the group consisting of formic acid, acetic acid, propionic acid, oxalic acid, malonic acid, succinic acid, citric acid, tripolyphosphoric acid, polyphosphoric acid, and combinations thereof.

In some implementations, the mass ratio of the titanate to the protonic acid is 1:(0.5-2.0).

In some implementations, the mass percentage of titanium element in the polymerization catalyst is 1.0%-3.0%.

In some implementations, the mass of titanium element in the esterification catalyst accounts for 30~40 ppm of the mass of the high-viscosity PBT melt.

In some implementations, the mass of titanium element in the polymerization catalyst accounts for 30~80 ppm of the mass of the high-viscosity PBT melt.

In some implementations, when preparing the high-viscosity PBT melt, the preparation method further comprises a step of introducing a heat stabilizer and an antioxidant or a colorant into the second esterification reactor before the second esterification reaction; the heat stabilizer is selected from the group consisting of trimethyl phosphate, triethyl phosphate, triphenyl phosphate, triphenyl phosphite, triglycerol phosphate, and combinations thereof; the antioxidant is selected from the group consisting of Antioxidant 168, Antioxidant 1076, Antioxidant 1010, Antioxidant 1222, benzothiazole antioxidants, and combinations thereof.

In some implementations, the usage amount of the heat stabilizer or the antioxidant is 30~300 ppm of the total mass of the high-viscosity PBT melt.

To ensure the excellent anti-thermal degradation and anti-thermal oxidative degradation functions of the high-viscosity PBT melt during the processes of esterification and polymerization melts transportation, heat stabilizers and antioxidants are used for compounding, and to improve the stability of the high-viscosity PBT melt, the above additives can be added to respectively improve the thermal stability and antioxidant properties of the melt. To control the side reaction level in polymerization under high temperature conditions, the above-mentioned heat stabilizers and antioxidants are added, and antioxidants are added to further reduce the thermal degradation caused by trace oxygen during the melt transport processes.

Heat stabilizers and antioxidants are beneficial for reducing the viscosity drop level during the melt transport processes, for the high-viscosity PBT melt transport, the residence time in the pipeline is within 30~40 min, and the viscosity drop of the high-viscosity PBT melt is effectively controlled between 0.050 and 0.105, a more optimized viscosity drop level is between 0.075 and 0.095, and when combined with the design of short process melt transport, the optimal viscosity drop is between 0.085 and 0.090, compared with the existing viscosity drop of 0.150 to 0.235 for the high-viscosity PBT polyester, it can significantly reduce the original intrinsic viscosity of the melt and effectively improve product quality.

In some implementations, the high-viscosity PBT polymerization reactor further comprises a steam feed inlet for introducing superheated 1,4-butanediol steam at the top of the main body located in the middle portion of the med-high viscosity zone, the rear end portion of the med-high viscosity zone, and the rear end portion of the high viscosity zone, and the preparation method further comprises steps of using a metering system to meter the superheated 1,4-butanediol steam and introducing it into the high-viscosity PBT polymerization reactor. Its function is that after the high-viscosity PBT polymerization reactor runs for a period of time, gel cross-linking carbonization will be formed at the upper portion of the rear end of the reactor, the function of disposing the 1, 4-butanediol steam feed inlet is to facilitate regular cleaning on the basis of the whole polymerization device not stopping (without stop), so as to maintain the long-term operation capacity of the device.

In some implementations, the high-viscosity PBT polymerization reactor is connected to a vacuum pump, and the ultimate vacuum degree of the vacuum pump is 60~75 Pa, and the preparation method controls the pumping rate of the vacuum pump to be 85~230 kg/h; the vacuum degree in the high-viscosity PBT polymerization reactor is controlled to 90~150 Pa. The pumping capacity of the above vacuum pump can meet the production capacity of 30,000 to 100,000 tons/year.

According to experimental research data, the volatile matter generation of the high-viscosity (intrinsic viscosity of 1.05~1.16) PBT polymerization reactor is 1.5~2.2 times that of conventional-viscosity (intrinsic viscosity of 0.92) PBT polymerization devices, and the higher the viscosity at the high viscosity melt outlet, the higher the amount of non-condensable gas produced, therefore, the pumping design of the vacuum pump is 1.5~2.5 times that of conventional polymerization devices with the same production capacity, and according to the production capacity of 30,000~100,000 tons/year, the pumping capacity of the vacuum pump is selected in the range of 70~220 kg/h. The design of the vacuum system for the devices considers the hazards of acrolein and allyl alcohol, and adopts a fully enclosed design, and a neutralization device is designed for wastewater and exhaust gas, which is then sent to a stripping column for treatment, to meet emission standards.

In some implementations, melt pumps are used to transport the high-viscosity PBT melt and the low-viscosity PET melt, and melt coolers are disposed at outlets of the melt pumps; the preparation method controls the temperature of the high-viscosity PBT melt after being cooled by the melt cooler to be between 252 and 253° C.; filters and booster pumps are disposed between the melt pumps and the parallel composite spinning assembly; the preparation method controls the transport time of the high-viscosity PBT melt to be 30~40 min.

In some implementations, the PBT prepolymer introduced into the high-viscosity PBT polymerization reactor has an intrinsic viscosity of 0.280~0.350. After the melt in this zone enters the polymerization reactor, it can effectively reduce the overall material load on the disc surface of the polymerization reactor, obtain the optimal material residence time, significantly reduce the reaction level of the polymerization reactor, and cooperate with the heat stabilizers and thermal-oxidative stabilizers to minimize the amount of non-condensable gas produced.

In some implementations, the PBT prepolymer introduced into the high-viscosity PBT polymerization reactor has an intrinsic viscosity of 0.290~0.325.

In some implementations, the PBT prepolymer introduced into the high-viscosity PBT polymerization reactor has an intrinsic viscosity of 0.295~0.310.

In some implementations, the low-viscosity PET final polymerization reactor is a horizontal polymerization reactor, and the length-to-diameter ratio thereof is (2.2~2.8):1.0

In some implementations, the preparation method further comprises a step of introducing a viscosity reducer into the high-viscosity PBT melt before the high-viscosity PBT melt passes through a filter; the viscosity reducer is selected from the group consisting of poly(ethylene terephthalate-co-1,4-cyclohexanedimethylene terephthalate) (PETG), cationic dyeable polyester (CDP), easy cationic dyeable polyester (ECDP), atmospheric pressure boiling dyeing polyester EDDP, polybutylene terephthalate (PBT), and poly(trimethylene terephthalate) (PBT), and combinations thereof.

Further, the usage amount of the viscosity reducer is 0.2% to 3.0%, preferably 0.5% to 2.0%, and more preferably 0.8% to 1.5% of the total mass of the melt, the addition of the viscosity reducer can significantly reduce the kinematic viscosity of the high-viscosity melt, improve the efficiency of melt transport, and reduce the degradation in the process.

In some implementations, the molar ratio of terephthalic acid to 1, 4-butanediol is 1:(1.05~1.65).

In some implementations, the esterification reaction in the first esterification reactor used for preparing the high-viscosity PBT melt is carried out at 245° C.~247° C.

In some implementations, the esterification reaction in the second esterification reactor used for preparing the high-viscosity PBT melt is carried out at 248° C.~252° C.

In some implementations, the prepolymerization reaction in the first prepolymerization reactor used for preparing the high-viscosity PBT melt is carried out at 250° C.~252° C.

In some implementations, the prepolymerization reaction in the first prepolymerization reactor used for preparing the high-viscosity PBT melt is carried out at a pressure of 7~102 kPa.

In some implementations, the prepolymerization reaction in the second prepolymerization reactor used for preparing the high-viscosity PBT melt is carried out at 251° C.~252° C.

In some implementations, the prepolymerization reaction in the second prepolymerization reactor used for preparing the high-viscosity PBT melt is carried out at a pressure of 0.5~1.5 kPa.

In some implementations, the same spinning assembly is a composite spinning box.

In some implementations, the composite spinning box comprises a composite spinneret.

The present disclosure further provides a high-viscosity PBT/low-viscosity PET two-component elastic fiber prepared by the above-mentioned preparation method.

In some implementations, the two-component elastic fiber has a strength of 2.6~3.2 cN/dtex, a crimp shrinkage rate of 25%~75%, and a crimp stability of 82% 90%.

Due to the use of the above technical solutions, the present disclosure has the following advantages over the prior art:

The high-viscosity PBT polymerization reactor of the present disclosure adopts an unconventional disc reactor design, where the front chamber (the low viscosity zone) adopts a disc combination design and a separate homogenizer design on the outer edges of the disc combinations; the rear chamber (the med-high viscosity zone and the high viscosity zone) adopts the disc combination and the single-disc, as well as a composite scraper design, which may achieve slow release and pouring of materials from the low viscosity zone on the surface of the disc reactors, greatly increase the viscosity of the high-viscosity PBT melt, effectively reduce the side reaction level during the polymerization of the high-viscosity PBT, and ultimately achieve significant improvements in various properties of the two-component elastic fiber.

The present disclosure utilizes two different polyester production lines to produce a high-viscosity PBT polyester and a low-viscosity PET polyester, respectively, the two melts of different viscosities are then transported to the same parallel composite spinning assembly through melt transport, after which the high-viscosity PBT/low-viscosity PET two-component elastic fiber is prepared, achieving the preparation of direct melt-spun high-viscosity PBT/low-viscosity PET parallel elastic fiber.

In the present disclosure, a special polymerization catalyst is used, which is prepared by reacting a titanate with a protonic acid under anhydrous conditions, removing alcohol by-products, and dissolving in 1,4-butanediol, the polymerization catalyst does not contain Ti—OH groups and can significantly inhibit the hydrolysis of ordinary titanium-based catalysts during the polymerization stage, thereby significantly inhibiting the occurrence of side reactions during the polymerization stage, which is beneficial for improving the properties of the high-viscosity PBT melt and the properties of the final two-component elastic fiber.

In the present disclosure, the intrinsic viscosity of the high-viscosity PBT melt may reach 0.98~1.20, the intrinsic viscosity of the low-viscosity PET melt is 0.45~0.55, and the viscosity of this high-viscosity PBT melt is much higher than that of the prior art.

The two-component elastic fiber of the present disclosure has a strength of 2.6~3.0 cN/dtex, a crimp shrinkage rate of 20%~55%, and a crimp stability of 62%~75%, which are much higher than the levels of existing two-component elastic fibers. The two-component elastic fiber of the present disclosure can be various varieties such as FDY, POY, DTY, etc.

The industrial production of two-component elastic fibers using the preparation method of the present disclosure may achieve a production capacity of low-viscosity PET melt of 30,000~80,000 tons per year and a production capacity of high-viscosity PBT melt of 30,000 to 80,000 tons per year, and when the product is the high-viscosity PBT/low-viscosity PET direct melt-spun two-component elastic fiber, the overall production capacity of the device is 60,000 to 160,000 tons per year.

Wherein, 1—low viscosity zone, 2—med-high viscosity zone, 3—high viscosity zone, 4—composite scraper, 5—disc scraper, 6—axial scraper, 7—wall scraper, 8—agitating shaft, 9—disc reactor, 10—first esterification reactor, 11—second esterification reactor, 12—first prepolymerization reactor, 13—second prepolymerization reactor, 14—high-viscosity PBT polymerization reactor, 15—low-viscosity PET final polymerization reactor, 16—melt pump, 17—prepolymer inlet, 18—high-viscosity PBT melt outlet, 19—steam feed inlet, 20—homogenizer, 21—supporting seat, 22—sieve pore.

DETAILED DESCRIPTION OF EXEMPLARY EMBODIMENTS

The present disclosure is further explained in detail below in combination with specific embodiments; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments. In the following embodiments, unless otherwise specified, all raw materials are basically commercially available or prepared by conventional methods in the field.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

The present disclosure will be further described in conjunction with the accompanying drawings and preferred embodiments of the present disclosure. In the following embodiments, it should be noted that terms such as orientations "front" and "rear" are based on the flow direction of the materials, with the directions in which the material flows first being the front and the direction in which it flows later being the rear. For example, in FIG. 1, the term "front" refers to the left side of FIG. 1, and the term "rear" refers to the right side of FIG. 1, similarly, in FIG. 4, the term "front" refers to the right side of FIG. 4, and the term "rear" refers to the left side of FIG. 4. Therefore, the orientation and positional relationship described in the present disclosure are only for the convenience of describing the disclosure and simplifying the description, and do not indicate or imply that the device or element referred to must have a specific orientation, only have a specific orientation, be constructed and operated in a specific orientation, and therefore cannot be understood as a limitation of the present disclosure.

Figure 1:
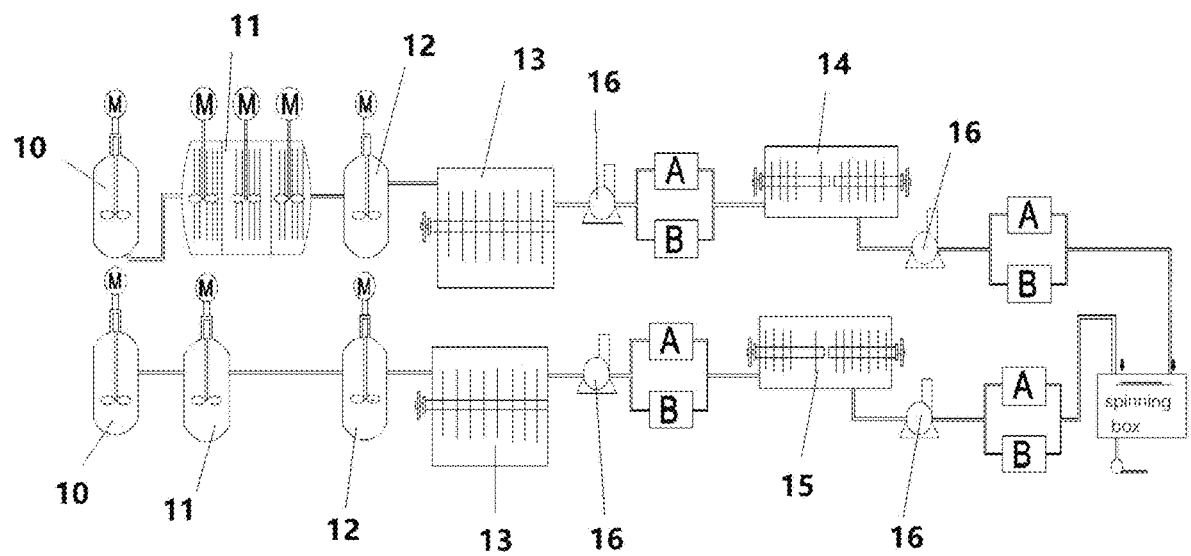
FIG. 1 is a schematic diagram of a polymerization system with two production lines used in an embodiment.

As shown in FIG. 1, the preparation of a high-viscosity PBT/low-viscosity PET two-component elastic fiber in an embodiment uses two production lines. The first production line prepares the high-viscosity PBT melt, as shown in the first row of FIG. 1, and this production line comprises a five-reactor system consisting of a first esterification reactor 10, a second esterification reactor 11, a first prepolymerization reactor 12, a second prepolymerization reactor 13, and a high-viscosity PBT polymerization reactor 14. The five reactors are in communication through necessary pipelines, and necessary vacuum systems and the like are in communication with the five reactors. Wherein, a melt pump 16 and filters A and B are provided between the second prepolymerization reactor 13 and the high-viscosity PBT polymerization reactor 14, and in the actual production process, the filters A and B are not turned on at the same time, for example, the filter A may be turned on first, and after the device runs for a period of time, the filter B can be switched to use, at this time, the filter A can be cleaned.

The second production line prepares the low-viscosity PET melt, as shown in the second row of FIG. 1, and this production line comprises another five-reactor system consisting of a first esterification reactor 10, a second esterification reactor 11, a first prepolymerization reactor 12, a second prepolymerization reactor 13, and a low-viscosity PET final polymerization reactor 15. The five reactors are in communication through necessary pipelines, and necessary vacuum systems and the like are in communication with the five reactors. Wherein, a melt pump 16 and filters A and B are provided between the second prepolymerization reactor 13 and the low-viscosity PET final polymerization reactor 15, and in the actual production process, the filters A and B are not turned on at the same time, for example, the filter A may be turned on first, and after the device runs for a period of time, the filter B can be switched to use, at this time, the filter A can be cleaned.

As shown in FIG. 1, the second esterification reactor 11 used for preparing the high-viscosity PBT melt is a horizontal reactor, and comprises three compartments arranged in sequence from front to rear. The first esterification reactor 10 and the second esterification reactor 11 used for preparing the high-viscosity PBT melt are both provided with distillation columns at their upper ends. The tops of the columns are provided with extraction systems for the mixture of water and tetrahydrofuran, the extraction systems are in communication with a three-column distillation recovery system, to purify and recover tetrahydrofuran through distillation.

Figure 4:
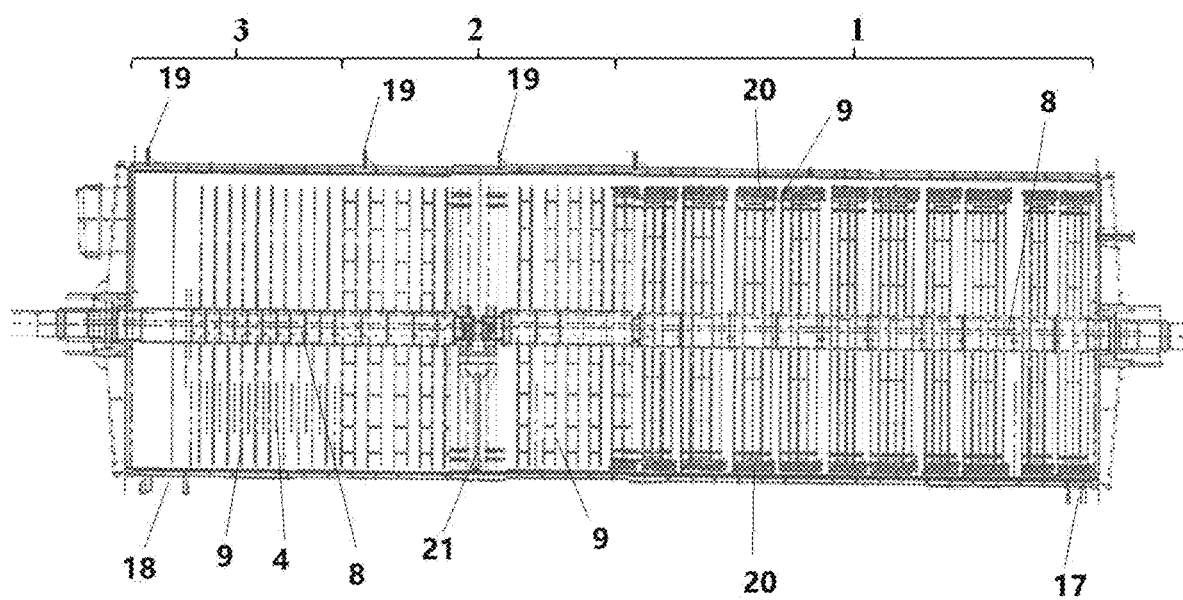
FIG. 4 is a schematic structural diagram of a high-viscosity PBT polymerization reactor used in the embodiment.

For the high-viscosity PBT polymerization reactor 14, as shown in FIG. 4, it is also a horizontal polymerization reactor, and comprises a main body containing a chamber internally, the main body comprises a low viscosity zone 1, a med-high viscosity zone 2, and a high viscosity zone 3 disposed in sequence along the axial direction of the high-viscosity PBT polymerization reactor 14, the viscosity of the PBT melt in the low viscosity zone 1, the med-high viscosity zone 2, and the high viscosity zone 3 increases in sequence; the high-viscosity PBT polymerization reactor 14 further comprises two agitating shafts 8, with one agitating shaft 8 being disposed in the low viscosity zone 1 and part of the med-high viscosity zone 2, and the other agitating shaft 8 being disposed in the high viscosity zone 3 and the remaining med-high viscosity zone 2.

A plurality of disc reactors 9 is installed on each agitating shaft 8, and the disc reactors 9 in the low viscosity zone 1 are three- to ten-disc combination; the disc reactors 9 in the med-high viscosity zone 2 are two-disc combination; the disc reactors 9 in the high viscosity zone 3 are single-disc. The total number of disc reactors 9 in the low viscosity zone 1 is 25 to 35, the total number of disc reactors 9 in the med-high viscosity zone 2 and the high viscosity zone 3 is 20 to 30, and the total number of disc reactors 9 in the high viscosity zone 3 is 8 to 12.

As shown in FIG. 4, the length of the low viscosity zone 1 is half of the length of the high-viscosity PBT polymerization reactor 14, and the total length of the med-high viscosity zone 2 and the high viscosity zone 3 is half of the length of the high-viscosity PBT polymerization reactor 14; the ratio of the length of the med-high viscosity zone 2 to that of the high viscosity zone 3 is 2:1. The length of the agitating shaft 8 disposed in the low viscosity zone 1 and part of the med-high viscosity zone 2 is two thirds of the length of the high-viscosity PBT polymerization reactor 14, and the length of the agitating shaft 8 disposed in the high viscosity zone 3 and the remaining med-high viscosity zone 2 is one third of the length of the high-viscosity PBT polymerization reactor 14. It should be emphasized that half, two thirds, and one third in the present disclosure are not exact values of half, two thirds, and one third, but refer to values approximately or around half, two thirds, one third, and roughly equal to half, two thirds, and one third.

The high-viscosity PBT polymerization reactor 14 further comprises a prepolymer inlet 17 located at the bottom of the front end of the low viscosity zone 1 and a high-viscosity PBT melt outlet 18 located at the bottom of the rear end of the high viscosity zone 3, wherein the high-viscosity PBT melt outlet 18 is trumpet-shaped.

Figure 2:
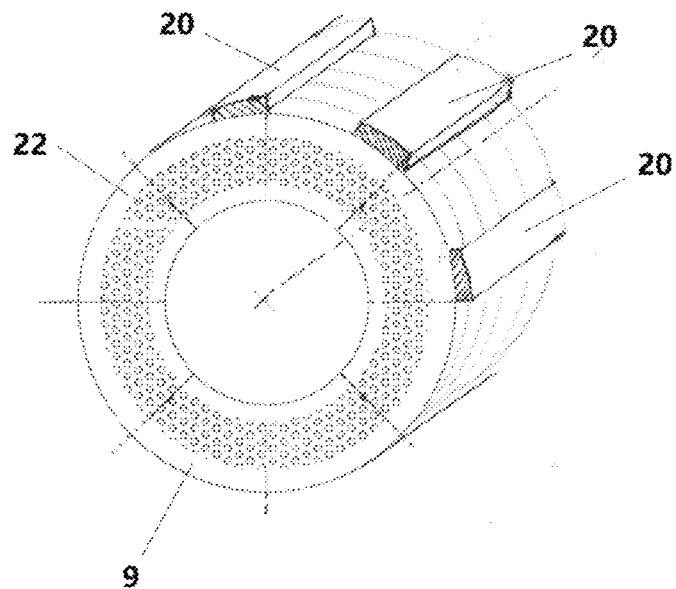
FIG. 2 is a schematic structural diagram of a disc combination in the low-viscosity zone of the high-viscosity PBT polymerization reactor used in the embodiment.
Figure 3:
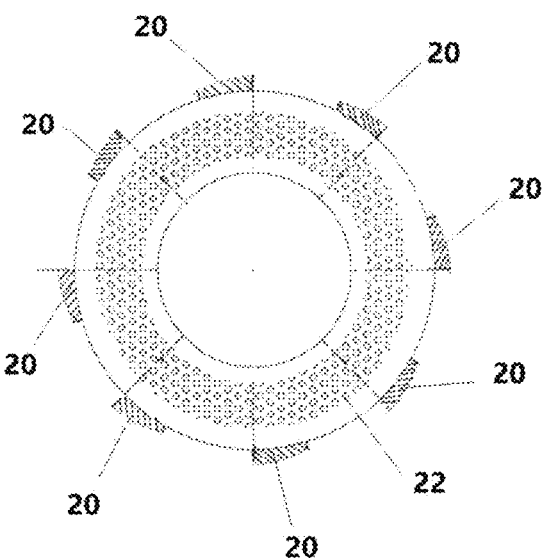
FIG. 3 is a schematic cross-sectional diagram of the disc combination in the low-viscosity zone of the high-viscosity PBT polymerization reactor used in the embodiment.

As shown in FIGS. 2-3, a plurality of homogenizers 20 is arranged at intervals on an outer edge of each disc combination along its circumferential direction in the low viscosity zone 1 of the high-viscosity PBT polymerization reactor 14, and the homogenizers 20 extend along the axial direction of the high-viscosity PBT polymerization reactor 14, and is used to pour the PBT melt from the low viscosity zone 1 onto the surfaces of the disc reactors 9. The cross-section of the homogenizers 20 is in a wedge shape, and the thick end of the wedge is oriented towards the direction of rotation of the disc reactors 9; there are 8 to 12 homogenizers. Although the example in FIG. 3 shows 8 homogenizers 20, it does not necessarily mean that the number of homogenizers 20 in the present disclosure must be 8. Preferably, the homogenizers 20 are uniformly distributed along the circumferential direction of the disc reactors 9.

As shown in FIG. 4, in the two-disc combination of the med-high viscosity zone 2, the distances between the disc combinations and between their two discs gradually increases from front to rear; the diameter of the disc reactors 9 in the high viscosity zone 3 decreases from front to rear, and the diameter of the last disc reactor 9 in the high viscosity zone 3 is 88%-92% of the diameter of the first disc reactor 9 in the high viscosity zone 3.

Figure 5:
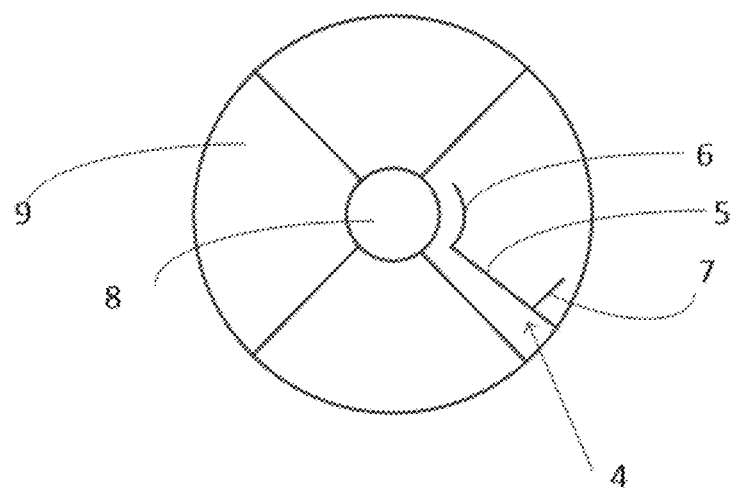
FIG. 5 is a schematic structural diagram of a composite scraper in the high viscosity zone of the high-viscosity PBT polymerization reactor used in the embodiment.

As shown in FIGS. 4-5, the high viscosity zone 3 is further provided with a composite scraper 4, the composite scraper 4 comprises an axial scraper 6 for scraping off the melt on the agitating shaft, a wall scraper 7 for scraping off the melt on the inner wall of the high-viscosity PBT polymerization reactor 14, a disc scraper 5 for scraping off the melt on the disc reactors 9, and a bottom scraper, the disc scraper 5 is arranged in two layers and controls the thickness of the material on the disc reactors 9 to not exceed 30 mm.

The high-viscosity PBT polymerization reactor 14 further comprises a steam feed inlet for introducing superheated 1,4-butanediol steam at the top of the main body located in the middle portion of the med-high viscosity zone 2, the rear end portion of the med-high viscosity zone 2, and the rear end portion of the high viscosity zone 3. The high-viscosity PBT polymerization reactor 14 is connected to a vacuum pump, and the ultimate vacuum degree of the vacuum pump is 60~75 Pa.

The high-viscosity PBT melt and the low-viscosity PET melt are transported using melt pumps, with outlets of the melt pumps being provided with melt coolers.

As shown in FIG. 1, the low-viscosity PET final polymerization reactor 15 is a horizontal polymerization reactor, and the length-to-diameter ratio thereof is (2.2~2.8):1.0

The high-viscosity PBT polymerization reactor 14 is connected to a vacuum pump, and the vacuum pump is a liquid ring pump, with its inlet being provided with a chilled water device for cooling the gas. The melt pumps transport the high-viscosity PBT melt and the low-viscosity PET melt, with their outlets being provided with melt coolers.

A dynamic mixer and a filter are arranged downstream of the high-viscosity PBT polymerization reactor 14 and upstream of the same spinning assembly; a viscosity reducer injection system is arranged upstream of the dynamic mixer.

Necessary melt pumps, vacuum pumps, and conveying pipeline, etc. may be provided on the pipelines connecting the five reactors of the two production lines.

The same spinning assembly is a composite spinning box, and the high-viscosity PBT polymerization reactor 14 is arranged at the top of the composite spinning box to shorten the conveying distance of the melt, especially the high-viscosity PBT melt. The composite spinning box comprises a spinneret.

Embodiment 1

This embodiment provided a method for preparing a high-viscosity PBT/low-viscosity PET two-component elastic fiber, which comprises specific steps of:

The method for preparing a polymerization catalyst used in this embodiment was as follows:

Tetrabutyl titanate was mixed with acetic acid to carry out an exothermic reaction, with a mass ratio of 1:1, after the reaction, a titanium tetraacetate complex and a large amount of n-butanol byproduct were generated, the reaction system was vacuum purified at 50° C. for 2.0 hours to remove the generated n-butanol, and cooled to room temperature, 1,4-butanediol was injected into the reaction system under agitating to prepare a 1,4-butanediol solution of the polymerization catalyst, the injection amount of 1,4-butanediol was controlled so that the content of titanium element in the polymerization catalyst solution was 1.0%.

A polymerization device using the two production lines mentioned above was used to synthesize the high-viscosity PBT melt and the low-viscosity PET melt, respectively.

For the high-viscosity PBT melt production line, the device comprises a pulping reactor, a first esterification reactor (with a distillation column at its upper end), a second esterification reactor (with a three-chamber structure, and a distillation column at its upper end), a first prepolymerization reactor, a second prepolymerization reactor, a high-viscosity PBT polymerization reactor, and supporting vacuum systems and melt transport systems.

For the low-viscosity PET melt production line, the device comprises a pulping reactor, a first esterification reactor, a second esterification reactor, a first prepolymerization reactor, a second prepolymerization reactor, a low-viscosity PET final polymerization reactor, and supporting vacuum systems and melt transport systems.

Synthesis of High-Viscosity PBT Melt:

Purified terephthalic acid and 1,4-butanediol were sequentially subjected to esterification reactions in the first esterification reactor and the second esterification reactor, and prepolymerization reactions in the first prepolymerization reactor and the second prepolymerization reactor to give a PBT prepolymer, which was polymerized in the high-viscosity PBT polymerization reactor to give a high-viscosity PBT melt. The molar ratio of purified terephthalic acid to 1,4-butanediol was 1:1.25. The esterification temperature in the first esterification reactor was 245° C.~247° C., and the esterification was carried out at a pressure of 40~60 kPa (this pressure refers to the actual pressure in the first esterification reactor, which is lower than atmospheric pressure, that is, the reaction the first esterification reactor is in fact carried out under reduced pressure). The esterification temperature in the second esterification reactor was 248° C.~252° C., and the esterification was carried out under normal pressure. An esterification catalyst was added to the first esterification reactor: TOT catalyst (tetra (2-ethylhexoxy) titanate) produced by Nippon Soda Co., Ltd., with a usage amount such that the mass of titanium element was 30 ppm of the melt mass. The polymerization catalyst prepared above was introduced into the third compartment from front to rear of the second esterification reactor, with a usage amount such that the mass of titanium element was 70 ppm of the melt mass. No matting agent was added. The reaction temperature in the first prepolymerization reactor was 250~252° C., and the vacuum degree was 9.9 kPa; the reaction temperature in the second prepolymerization reactor was 251~252° C., and the vacuum degree was 1.05 kPa; the temperature at the melt outlet of the high-viscosity PBT polymerization reactor was 252.2° C., and the vacuum degree in the high-viscosity PBT polymerization reactor was 133 Pa. The steam feed inlet of the high-viscosity PBT polymerization reactor was sprayed with superheated 1,4-butanediol through a steam jet pump, and for the large amount of tetrahydrofuran generated during the polymerization process, it was accurately separated by a large-capacity chilled water plate exchanger arranged before the vacuum liquid ring pump. The high-viscosity PBT melt discharged ultimately from the melt outlet of the high-viscosity PBT polymerization reactor had an intrinsic viscosity of 1.149, and a dynamic viscosity of 505 Pa·s, where the intrinsic viscosity was determined in a mixed solvent of phenol and tetrachloroethane in a volume ratio of 3:2. The dynamic viscosity was measured at 252° C.

Synthesis of Low-Viscosity PET Melt:

Purified terephthalic acid and ethylene glycol were sequentially subjected to esterification reactions in the first esterification reactor and the second esterification reactor, and prepolymerization reactions in the first prepolymerization reactor and the second prepolymerization reactor to give a PET prepolymer, which was polymerized in the low-viscosity PET final polymerization reactor to give a low-viscosity PET melt. Both the catalysts for esterification and polymerization were ethylene glycol antimony, and its usage amount was such that the mass of antimony element in it was 210 ppm of the total mass of the PET melt, and this catalyst was added to the reaction system in the first esterification reactor. The first esterification reactor was for esterification under pressurization, and the second esterification reactor was for esterification at atmospheric pressure. No matting agent was added. By adjusting the reaction conditions (including the vacuum degree of the low-viscosity PET final polymerization reactor, the agitating rate of the low-viscosity PET final polymerization reactor, the polymerization temperature of the low-viscosity PET final polymerization reactor, etc., the vacuum degree was controlled at 180~220 Pa, the agitating rate was 4.0~6.0 rpm in the low viscosity zone (front chamber), and 1.5~3.5 rpm in the med-high viscosity zone and high viscosity zone (rear chamber); the polymerization temperature ranged from 272 to 275° C.), the resulting low-viscosity PET melt had an intrinsic viscosity of 0.450, and a dynamic viscosity of 90 Pa·s. The intrinsic viscosity was measured in a mixed solvent of phenol and tetrachloroethane in a volume ratio of 3:2. The dynamic viscosity was measured at 270° C.

Spinning:

Finally, the high-viscosity PBT melt and the low-viscosity PET melt were transported through the melt transport in a mass ratio of 5:5 to the composite spinning box, and then spun through the composite spinning spinneret to obtain a high-viscosity PBT/low-viscosity PET two-component elastic fiber.

Wherein, the parameters of reaction conditions, high-viscosity PBT melt, and low-viscosity PET melt are shown in Tables 1-5. Wherein, '-' indicates none. The melt chip performance was tested using GB/T 14190-2017 standard, where the intrinsic viscosity was measured in a mixed solvent of phenol and tetrachloroethylene in a volume ratio of 3:2; moisture, ash content, ferrum content, and agglomerated particles refer to the content of water, ash, Fe element, and agglomerated particles in the polyester in mass fraction, respectively. Wherein, the unit of intrinsic viscosity is dL/g.

Embodiments 2-13

Embodiments 2-13 provided methods for preparing a high-viscosity PBT/low-viscosity PET two-component elastic fiber, where the specific steps were basically the same as in Embodiment 1, by differing in that when synthesizing the high-viscosity PBT melt, the parameters of the high-viscosity PBT melt were adjusted by adjusting the reaction conditions (including the vacuum degree of the high-viscosity PBT polymerization reactor, the agitating rate in the low viscosity zone, the agitating rate in the med-high viscosity zone and the high viscosity zone, the inlet temperature of the PBT prepolymer melt (PBT low-viscosity melt), and the residence time of material in the polymerization reactor, etc.); when synthesizing the low-viscosity PET melt, the parameters of the low-viscosity PET melt were adjusted by adjusting the reaction conditions (including the vacuum degree of the low-viscosity PET final polymerization reactor, the agitating rate in the low-viscosity PET final polymerization reactor, and the polymerization temperature in the low-viscosity PET final polymerization reactor). And during polymerization, a side reaction inhibitor, a Lewis base: triethanolamine, which accounts for 160 ppm of the mass of the high-viscosity PBT melt, was introduced into the first compartment from front to rear of the second esterification reactor. Wherein, the parameters of reaction conditions, high-viscosity PBT melt, and low-viscosity PET melt are shown in Tables 1-5.

Embodiment 14

Embodiment 14 provided a method for preparing a high-viscosity PBT/low-viscosity PET two-component elastic fiber, where the specific steps were basically the same as in Embodiment 1, by differing in that when synthesizing the high-viscosity PBT melt, the parameters of the high-viscosity PBT melt were adjusted by adjusting the reaction conditions (including the vacuum degree of the high-viscosity PBT polymerization reactor, the agitating rate in the low viscosity zone, the agitating rate in the med-high viscosity zone and the high viscosity zone, the inlet temperature of the PBT prepolymer melt (PBT low-viscosity melt), and the residence time of material in the polymerization reactor, etc.); when synthesizing the low-viscosity PET melt, the parameters of the low-viscosity PET melt were adjusted by adjusting the reaction conditions (including the vacuum degree of the low-viscosity PET final polymerization reactor, the agitating rate in the low-viscosity PET final polymerization reactor, and the polymerization temperature in the low-viscosity PET final polymerization reactor). And during polymerization, a side reaction inhibitor, a Lewis base: triethanolamine, which accounts for 160 ppm of the mass of the high-viscosity PBT melt, was introduced into the first compartment from front to rear of the second esterification reactor. In addition, a viscosity reducer was injected into the system, specifically an amorphous polyester with an intrinsic viscosity of 0.55 (measured using phenol:tetrachloroethylene (in a volume ratio of 3:2)), with a usage amount of 0.5% of the total mass of the melt. Wherein, the parameters of reaction conditions, high-viscosity PBT melt, and low-viscosity PET melt are shown in Tables 1-5.

Embodiment 15

Embodiment 15 provided a method for preparing a high-viscosity PBT/low-viscosity PET two-component elastic fiber, where the specific steps were basically the same as in Embodiment 1, by differing in that when synthesizing the high-viscosity PBT melt, the parameters of the high-viscosity PBT melt were adjusted by adjusting the reaction conditions (including the vacuum degree of the high-viscosity PBT polymerization reactor, the agitating rate in the low viscosity zone, the agitating rate in the med-high viscosity zone and the high viscosity zone, the inlet temperature of the PBT prepolymer melt (PBT low-viscosity melt), and the residence time of material in the polymerization reactor, etc.); when synthesizing the low-viscosity PET melt, the parameters of the low-viscosity PET melt were adjusted by adjusting the reaction conditions (including the vacuum degree of the low-viscosity PET final polymerization reactor, the agitating rate in the low-viscosity PET final polymerization reactor, and the polymerization temperature in the low-viscosity PET final polymerization reactor). And during polymerization, a side reaction inhibitor, a Lewis base: triethanolamine, which accounts for 160 ppm of the mass of the high-viscosity PBT melt, was introduced into the first compartment from front to rear of the second esterification reactor. In addition, a viscosity reducer was injected into the system, specifically an amorphous polyester with an intrinsic viscosity of 0.58 (measured using phenol:tetrachloroethylene (in a volume ratio of 3:2)), with a usage amount of 0.8% of the total mass of the melt. Wherein, the parameters of reaction conditions, high-viscosity PBT melt, and low-viscosity PET melt are shown in Tables 1-5.

Comparative Example 1

This comparative example 1 provided a method for preparing a direct melt-spun high-viscosity PET/low-viscosity PET two-component elastic fiber. This preparation method adopted a six-reactor system consisting of a first esterification reactor, a second esterification reactor, a first prepolymerization reactor and a second prepolymerization reactor connected successively, and a high viscosity final polymerization reactor and a low viscosity final polymerization reactor respectively connected to the second prepolymerization reactor. The high-viscosity PET melt obtained in the high viscosity final polymerization reactor and the low-viscosity PET obtained in the low viscosity final polymerization reactor were simultaneously transported through melt transport to the same spinning assembly for parallel spinning. Wherein, the second esterification reactor was provided with three compartments. The high viscosity final polymerization reactor and the low viscosity final polymerization reactor both adopted a conventional structure in the prior art.

In particular, terephthalic acid, ethylene glycol and a catalyst ethylene glycol antimony were sequentially subjected to esterification reactions in the first esterification reactor and the second esterification reactor, and prepolymerization reactions in the first prepolymerization reactor and the second prepolymerization reactor to give an ethylene terephthalate prepolymer, and before the second esterification reaction in the second esterification reactor, an ordinary titanium dioxide matting agent color paste (prepared by grinding and dispersing titanium dioxide and ethylene glycol, with titanium dioxide accounting for 10 wt % and ethylene glycol accounting for 90 wt %) was added into one compartment of the second esterification reactor through corresponding pipelines. Wherein, the molar ratio of terephthalic acid to ethylene glycol was 1:1.25, and based on antimony element, the usage amount of catalyst mentioned above was 210 ppm of the total mass of the melt; the usage amount of matting agent was such that titanium dioxide accounted for 0.3% of the total mass of the melt. The ethylene terephthalate prepolyme was then introduced into the high viscosity final polymerization reactor and the low viscosity final polymerization reactor for polymerization, to give a high-viscosity PET melt and a low-viscosity PET melt; finally, the high-viscosity PET melt and the low-viscosity PET melt were directly introduced in a mass ratio of 5:5 to the same parallel composite spinning box for spinning, to obtain a PET two-component elastic fiber. Wherein, the parameters of the high-viscosity PBT melt and the low-viscosity PET melt are shown in Tables 3-5. The fiber properties in the present disclosure were tested according to GBT 8960-2015 testing standard.

Comparative Example 2

This comparative example 2 provided a method for preparing a chip-spun high-viscosity PTT/low-viscosity PET two-component elastic fiber. In particular, a high-viscosity PTT melt chip and a low-viscosity PET melt chip were pre-crystallized and dry screw melted, the two melts were then directly introduced in a mass ratio of 5:5 to the same parallel composite spinning box for spinning, to obtain a chip-spun two-component elastic fiber. The properties of the corresponding chips are shown in Tables 3-5. Wherein, the high-viscosity PTT chip and the low-viscosity PET chip were both obtained commercially, both containing a titanium dioxide matting agent, which was in a mass of 0.32% of the mass of the two chips.

Comparative Example 3

This comparative example 3 provided a method for preparing a chip-spun high-viscosity EDDP (disperse atmospheric metachromatic polyester)/low-viscosity PET two-component elastic fiber. In particular, a high-viscosity EDDP melt chip and a low-viscosity PET melt chip were pre-crystallized and dry screw melted, and the two melts were then directly introduced in a mass ratio of 5:5 to the same parallel composite spinning box for spinning, to obtain a chip-spun two-component elastic fiber. The properties of the corresponding chips are shown in Tables 3-5.

TABLE 1

Test indicators for esterification materials of high-viscosity PBT polyester

| PBT production line | Acid value (mg KOH/g) | | Agglomerated particles (5~10 μm)/mg | | Esterification rate | |
| --- | --- | --- | --- | --- | --- | --- |
| | First esterification reactor | Second esterification reactor | First esterification reactor | Second esterification reactor | First esterification reactor | Second esterification reactor |
| Embodiment 1 | 37.50 | 13.93 | — | 0.03 | 92.9% | 97.5% |
| Embodiment 2 | 36.55 | 13.90 | — | 0.00 | 92.6% | 97.6% |
| Embodiment 3 | 36.52 | 13.82 | — | 0.02 | 93.1% | 97.8% |
| Embodiment 4 | 38.18 | 13.55 | — | 0.01 | 92.7% | 97.6% |
| Embodiment 5 | 38.56 | 12.98 | — | 0.01 | 92.5% | 98.2% |
| Embodiment 6 | 37.39 | 13.75 | — | 0.02 | 94.0% | 98.2% |
| Embodiment 7 | 37.61 | 13.84 | — | 0.00 | 93.8% | 98.5% |
| Embodiment 8 | 38.49 | 13.58 | — | 0.00 | 93.1% | 98.6% |
| Embodiment 9 | 37.15 | 13.53 | — | 0.03 | 94.2% | 98.3% |
| Embodiment 10 | 37.67 | 13.33 | — | 0.01 | 93.5% | 98.5% |
| Embodiment 11 | 37.52 | 12.85 | — | 0.00 | 93.7% | 98.4% |
| Embodiment 12 | 37.77 | 12.90 | — | 0.00 | 93.9% | 98.3% |
| Embodiment 13 | 38.28 | 13.25 | — | 0.04 | 92.8% | 98.1% |
| Embodiment 14 | 37.65 | 12.87 | — | 0.02 | 93.5% | 98.3% |
| Embodiment 15 | 38.34 | 13.20 | — | 0.01 | 92.6% | 97.8% |

TABLE 2

Test indicators for materials in the high-viscosity PBT second prepolymerization reactor

| | Prepolymer intrinsic viscosity (IV) | Agglomerated particles (5~10 μm)/mg |
|---|---|---|
| Embodiment 1 | 0.353 | 0.54 |
| Embodiment 2 | 0.356 | 0.46 |
| Embodiment 3 | 0.353 | 0.35 |
| Embodiment 4 | 0.347 | 0.29 |
| Embodiment 5 | 0.348 | 0.36 |
| Embodiment 6 | 0.356 | 0.41 |
| Embodiment 7 | 0.349 | 0.37 |
| Embodiment 8 | 0.347 | 0.28 |
| Embodiment 9 | 0.348 | 0.10 |
| Embodiment 10 | 0.346 | 0.01 |
| Embodiment 11 | 0.340 | 0.04 |
| Embodiment 12 | 0.337 | 0.05 |
| Embodiment 13 | 0.334 | 0.02 |
| Embodiment 14 | 0.340 | 0.07 |
| Embodiment 15 | 0.339 | 0.04 |

Note

The intrinsic viscosity was measured using a mixed solvent of phenol and tetrachloroethane (3:2).

TABLE 3

Test indicators for high-viscosity PBT polyester chips

| Items Unit | Intrinsic viscosity dl/g | Titanium dioxide % | Carboxyl terminal group mol/t | Agglomerated particles ≤10 μm /mg | Agglomerated particles 5~10 μm /mg | Moisture % | Melting point °C. | Hue L value | Hue B value | Ash % | Ferrum content % |
|---|---|---|---|---|---|---|---|---|---|---|---|
| Embodiment 1 | 1.149 | — | 10.3 | 0.03 | 0.01 | 0.14 | 225.2 | 86.7 | 3.99 | 0.03 | — |
| Embodiment 2 | 1.152 | — | 10.9 | 0.01 | 0.03 | 0.13 | 225.3 | 86.4 | 4.05 | 0.03 | — |
| Embodiment 3 | 1.150 | — | 10.6 | 0.01 | 0.02 | 0.15 | 225.4 | 85.5 | 4.13 | 0.03 | — |
| Embodiment 4 | 1.148 | — | 10.8 | 0.02 | 0.03 | 0.15 | 225.3 | 85.8 | 3.96 | 0.02 | — |
| Embodiment 5 | 1.152 | — | 10.2 | 0.01 | 0.03 | 0.14 | 225.0 | 87.2 | 4.02 | 0.03 | — |
| Embodiment 6 | 1.151 | — | 10.5 | 0.00 | 0.02 | 0.13 | 225.3 | 86.7 | 3.65 | 0.02 | — |
| Embodiment 7 | 1.149 | — | 10.3 | 0.03 | 0.02 | 0.16 | 225.5 | 87.3 | 3.86 | 0.03 | — |
| Embodiment 8 | 0.982 | — | 12.2 | 0.02 | 0.03 | 0.12 | 225.3 | 86.8 | 4.08 | 0.02 | — |
| Embodiment 9 | 1.021 | — | 11.8 | 0.04 | 0.03 | 0.15 | 225.1 | 87.3 | 4.46 | 0.02 | — |
| Embodiment 10 | 1.060 | — | 11.2 | 0.03 | 0.02 | 0.13 | 225.3 | 86.3 | 4.69 | 0.02 | — |
| Embodiment 11 | 1.102 | — | 10.9 | 0.02 | 0.03 | 0.12 | 225.2 | 87.2 | 4.98 | 0.03 | — |
| Embodiment 12 | 1.161 | — | 10.2 | 0.01 | 0.04 | 0.15 | 225.5 | 86.5 | 5.45 | 0.02 | — |
| Embodiment 13 | 1.203 | — | 10.9 | 0.01 | 0.00 | 0.16 | 224.9 | 86.5 | 5.72 | 0.03 | — |
| Embodiment 14 (0.5% viscosity reducer added) | 1.152 | — | 11.2 | 0.02 | 0.03 | 0.13 | 225.3 | 87.3 | 4.22 | 0.03 | — |
| Embodiment 15 (0.8% viscosity reducer added) | 1.150 | — | 10.9 | 0.02 | 0.04 | 0.14 | 225.3 | 80.9 | 4.70 | 0.02 | — |
| Comparative example 1 (PET/PET) | 0.731 | 0.30 | 23.8 | 0.00 | 0.00 | 0.16 | 258.6 | 82.7 | 4.62 | 0.00 | — |
| Comparative example 2 (PTT/PET) | 1.050 | 0.32 | 11.6 | 0.02 | 0.03 | 0.12 | 228.8 | 88.4 | 6.05 | 0.04 | — |
| Comparative example 3 (EDDP/PET) | 0.803 | 0.30 | 22.7 | 0.00 | 0.01 | 0.25 | 246.5 | 80.6 | 6.27 | 0.01 | — |

Note:
The intrinsic viscosity was measured using a mixed solvent of phenol and tetrachloroethane (3:2); in Comparative example 1, the chip refers to the high-viscosity PET chip; in Comparative example 2, the chip refers to the high-viscosity PTT chip; in Comparative example 3, the chip refers to the high-viscosity EDDP chip.

TABLE 4

Physical and chemical indicators of low-viscosity PET polyester chips

| Items Unit | Intrinsic viscosity dl/g | Titanium dioxide % | Carboxyl terminal group mol/t | Agglomerated particles ≤10 μm /mg | Agglomerated particles 5~10 μm /mg | Moisture % | Melting point °C. | Hue L value | Hue B value | Ash % | Ferrum content % |
|---|---|---|---|---|---|---|---|---|---|---|---|
| Embodiment 1 | 0.450 | — | 28.1 | 0.00 | 0.00 | 0.17 | 259.1 | 84.3 | 2.99 | 0.00 | — |
| Embodiment 2 | 0.452 | — | 27.8 | 0.00 | 0.00 | 0.16 | 259.4 | 84.8 | 3.25 | 0.01 | — |

TABLE 4-continued

Physical and chemical indicators of low-viscosity PET polyester chips

| Items<br>Unit | Intrinsic<br>viscosity<br>dl/g | Titanium<br>dioxide<br>% | Carboxyl<br>terminal<br>group<br>mol/t | Agglomerated particles | | Moisture<br>% | Melting<br>point<br>° C. | Hue | | Ash<br>% | Ferrum<br>content<br>% |
|---|---|---|---|---|---|---|---|---|---|---|---|
| | | | | ≤10 μm<br>/mg | 5~10 μm<br>/mg | | | L<br>value | B<br>value | | |
| Embodiment 3 | 0.470 | — | 27.5 | 0.00 | 0.00 | 0.18 | 258.6 | 83.7 | 3.09 | 0.00 | — |
| Embodiment 4 | 0.491 | — | 27.3 | 0.00 | 0.00 | 0.14 | 259.0 | 83.9 | 3.16 | 0.00 | — |
| Embodiment 5 | 0.511 | — | 27.6 | 0.00 | 0.00 | 0.19 | 259.3 | 84.0 | 3.28 | 0.00 | — |
| Embodiment 6 | 0.532 | — | 27.8 | 0.00 | 0.00 | 0.15 | 258.2 | 84.5 | 3.35 | 0.02 | — |
| Embodiment 7 | 0.551 | — | 27.2 | 0.00 | 0.00 | 0.16 | 258.2 | 83.8 | 3.31 | 0.00 | — |
| Embodiment 8 | 0.550 | — | 27.2 | 0.00 | 0.00 | 0.18 | 259.6 | 84.6 | 3.28 | 0.02 | — |
| Embodiment 9 | 0.552 | — | 27.5 | 0.00 | 0.00 | 0.14 | 259.3 | 84.3 | 3.13 | 0.00 | — |
| Embodiment 10 | 0.549 | — | 27.3 | 0.00 | 0.00 | 0.16 | 258.6 | 84.1 | 3.39 | 0.01 | — |
| Embodiment 11 | 0.552 | — | 28.0 | 0.00 | 0.00 | 0.15 | 259.0 | 84.5 | 3.25 | 0.00 | — |
| Embodiment 12 | 0.548 | — | 28.2 | 0.00 | 0.00 | 0.17 | 259.4 | 83.7 | 2.99 | 0.00 | — |
| Embodiment 13 | 0.551 | — | 27.3 | 0.00 | 0.00 | 0.17 | 258.7 | 84.3 | 3.17 | 0.00 | — |
| Embodiment 14<br>(0.5% viscosity reducer added) | 0.550 | — | 27.5 | 0.00 | 0.00 | 0.16 | 259.3 | 84.1 | 3.25 | 0.02 | — |
| Embodiment 15<br>(0.8% viscosity reducer added) | 0.553 | — | 27.7 | 0.00 | 0.00 | 0.19 | 259.3 | 83.5 | 2.84 | 0.00 | — |
| Comparative example 1 | 0.473 | 0.30 | 28.2 | 0.00 | 0.00 | 0.16 | 259.5 | 84.8 | 2.99 | 0.01 | — |
| Comparative example 2 (PTT/PET) | 0.551 | 0.32 | 28.3 | 0.00 | 0.00 | 0.15 | 259.0 | 84.2 | 3.34 | 0.01 | — |
| Comparative example 3 | 0.473 | 0.31 | 29.0 | 0.00 | 0.00 | 0.16 | 259.7 | 84.5 | 3.18 | 0.00 | — |

Note:
The intrinsic viscosity was measured using a mixed solvent of phenol and tetrachloroethane (3:2).

TABLE 5

Control data of high-viscosity PBT polymerization reactor and related indicators of high-viscosity PBT and low-viscosity PET

| No. | Vacuum degree in polymerization reactor/Pa | Temperature at low viscosity PBT melt inlet/° C. | Agitating rate in low viscosity zone/rpm | Temperature at high-viscosity melt outlet/° C. | Agitating rate in med-high viscosity and high viscosity zones/rpm | Intrinsic viscosity at high viscosity PBT melt outlet/° C. | Viscosity of low viscosity PET melt | Viscosity difference between high viscosity PBT melt and low viscosity PET melt |
|---|---|---|---|---|---|---|---|---|
| Embodiment 1 | 133.0 | 248.4 | 5.0 | 252.2 | 2.75 | 1.149 | 0.450 | 0.699 |
| Embodiment 2 | 132.6 | 249.2 | 5.1 | 252.3 | 2.81 | 1.152 | 0.452 | 0.700 |
| Embodiment 3 | 135.3 | 248.8 | 5.0 | 252.2 | 2.75 | 1.150 | 0.470 | 0.680 |
| Embodiment 4 | 135.6 | 249.0 | 5.0 | 252.0 | 2.72 | 1.148 | 0.491 | 0.657 |
| Embodiment 5 | 134.8 | 248.7 | 5.0 | 252.1 | 2.75 | 1.152 | 0.511 | 0.641 |
| Embodiment 6 | 137.5 | 248.8 | 5.1 | 252.3 | 2.78 | 1.151 | 0.532 | 0.619 |
| Embodiment 7 | 132.7 | 249.2 | 5.2 | 252.8 | 2.74 | 1.149 | 0.551 | 0.598 |
| Embodiment 8 | 149.2 | 249.0 | 5.2 | 252.7 | 2.72 | 0.982 | 0.550 | 0.432 |
| Embodiment 9 | 146.8 | 249.3 | 5.3 | 252.9 | 2.75 | 1.021 | 0.552 | 0.469 |
| Embodiment 10 | 144.5 | 249.2 | 5.3 | 252.9 | 2.85 | 1.060 | 0.549 | 0.511 |
| Embodiment 11 | 137.6 | 249.5 | 5.4 | 252.6 | 2.88 | 1.102 | 0.552 | 0.550 |
| Embodiment 12 | 132.2 | 249.3 | 4.7 | 252.9 | 2.88 | 1.161 | 0.548 | 0.613 |
| Embodiment 13 | 126.8 | 248.9 | 5.5 | 252.8 | 2.78 | 1.203 | 0.551 | 0.652 |
| Embodiment 14 | 133.3 | 249.3 | 5.3 | 252.8 | 2.75 | 1.152 | 0.550 | 0.602 |
| Embodiment 15 | 132.5 | 249.1 | 5.4 | 252.6 | 2.77 | 1.150 | 0.553 | 0.597 |
| Comparative example 1 | 158.5 | 279.3 | 5.2 | 284.5 | 2.78 | 0.731 | 0.473 | 0.258 |
| Comparative example 2 (PTT/PET) | Not involved | Not involved | Not involved | Not involved | Not involved | 1.050 | 0.551 | 0.499 |
| Comparative example 3 | Not involved | Not involved | Not involved | Not involved | Not involved | 0.803 | 0.473 | 0.330 |

The properties of the composite elastic fibers obtained by spinning the high-viscosity melt and the low-viscosity PET melt corresponding to Embodiments 1-15 and Comparative Examples 1-3 are shown in Table 6, where the fiber variety is FDY and the specification is 83 dtex/36f. The fiber properties in the present disclosure were tested according to GBT 8960-2015 testing standard.

TABLE 6

Physical and chemical indicators of PBT/PET two-component composite elastic fibers

| No. | Specification | Denier count/ dtex | Strength/ cN/dtex | Elongation/ % | Oil content/ % | Yarn evenness CV/% | Boiling water shrinkage rate/% | Crimp shrinkage rate/% | Interlacing point |
|---|---|---|---|---|---|---|---|---|---|
| Embodiment 1 | 83/36 | 83.2 | 2.64 | 34.74 | 1.55 | 1.38 | 15.48 | 48.5 | 4 |
| Embodiment 2 | 83/36 | 82.6 | 2.67 | 33.80 | 1.57 | 1.36 | 15.35 | 49.2 | 4 |
| Embodiment 3 | 83/36 | 83.4 | 2.72 | 33.51 | 1.51 | 1.35 | 15.29 | 45.1 | 4 |
| Embodiment 4 | 83/36 | 82.7 | 2.75 | 32.18 | 1.54 | 1.37 | 15.22 | 43.2 | 4 |
| Embodiment 5 | 83/36 | 82.9 | 2.80 | 31.63 | 1.49 | 1.33 | 15.14 | 40.8 | 4 |
| Embodiment 6 | 83/36 | 82.6 | 2.84 | 30.90 | 1.53 | 1.36 | 15.11 | 38.4 | 4 |
| Embodiment 7 | 83/36 | 83.5 | 2.88 | 30.32 | 1.58 | 1.32 | 15.27 | 37.6 | 4 |
| Embodiment 8 | 83/36 | 82.9 | 2.57 | 36.16 | 1.53 | 1.35 | 15.15 | 24.3 | 4 |
| Embodiment 9 | 83/36 | 83.1 | 2.62 | 35.77 | 1.54 | 1.38 | 15.23 | 27.7 | 4 |
| Embodiment 10 | 83/36 | 83.3 | 2.66 | 34.55 | 1.56 | 1.36 | 14.96 | 28.9 | 5 |
| Embodiment 11 | 83/36 | 83.5 | 2.69 | 32.42 | 1.55 | 1.31 | 15.20 | 31.8 | 4 |
| Embodiment 12 | 83/36 | 82.8 | 2.84 | 30.03 | 1.55 | 1.37 | 15.04 | 33.6 | 4 |
| Embodiment 13 | 83/36 | 83.6 | 2.96 | 28.89 | 1.52 | 1.32 | 14.97 | 36.7 | 5 |
| Embodiment 14 | 83/36 | 83.2 | 2.92 | 30.52 | 1.57 | 1.35 | 15.15 | 35.7 | 4 |
| Embodiment 15 | 83/36 | 83.4 | 2.98 | 30.39 | 1.54 | 1.34 | 18.03 | 36.9 | 4 |
| Comparative example 1 (PET/PET) | 83/36 | 82.9 | 2.89 | 26.88 | 1.32 | 1.19 | 13.52 | 26.5 | 4 |
| Comparative example 2 (PTT/PET) | 83/36 | 82.8 | 3.05 | 30.03 | 1.45 | 1.34 | 18.08 | 62.6 | 4 |
| Comparative example 3 (EDDP/PET) | 83/36 | 83.1 | 2.68 | 29.55 | 1.40 | 1.42 | 16.54 | 30.3 | 4 |

It can be seen that the present disclosure utilizes two different polyester production lines to produce a high-viscosity PBT polyester and a low-viscosity PET polyester, respectively, the two melts of different viscosities are then transported to the same parallel composite spinning assembly through melt transport, after which the high-viscosity PBT/low-viscosity PET two-component elastic fiber is prepared, achieving the preparation of direct melt-spun high-viscosity PBT/low-viscosity PET parallel elastic fiber, the obtained fiber has excellent performance.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

What is claimed is:

1. A high-viscosity PBT polymerization reactor, used to prepare a high-viscosity PBT melt for preparing a high-viscosity PBT/low-viscosity PET two-component elastic fiber, wherein, the high-viscosity PBT polymerization reactor is a horizontal polymerization reactor, and comprises a main body containing a chamber internally, the main body comprises a low viscosity zone, a med-high viscosity zone, and a high viscosity zone arranged in sequence along the axial direction of the high-viscosity PBT polymerization reactor, the viscosity of the PBT melt in the low viscosity zone, the med-high viscosity zone and the high viscosity zone increases in sequence; the high-viscosity PBT polymerization reactor further comprises two agitating shafts, one of which is disposed in the low viscosity zone and part of the med-high viscosity zone, and the other one is disposed in the high viscosity zone and the remaining med-high viscosity zone; a plurality of disc reactors is disposed on each of the agitating shafts, and the disc reactors in the low viscosity zone are three- to ten-disc combination; the disc reactors in the med-high viscosity zone are two-disc combination; the disc reactors in the high viscosity zone are single-disc; a plurality of homogenizers is arranged at intervals on an outer edge of each disc combination along its circumferential direction in the low viscosity zone of the high-viscosity PBT polymerization reactor and the homogenizers extend along the axial direction of the high-viscosity PBT polymerization reactor and are used to pour the PBT melt from the low viscosity zone onto the surfaces of the disc reactors.

2. The high-viscosity PBT polymerization reactor according to claim 1, wherein, the cross-section of the homogenizers is in a wedge shape; the thick end of the wedge is oriented towards the direction of rotation of the disc reactors; and/or, there are 8 to 12 homogenizers.

3. The high-viscosity PBT polymerization reactor according to claim 1, wherein, the total number of disc reactors in the low viscosity zone is 25 to 35, the total number of disc reactors in the med-high viscosity zone and the high viscosity zone is 20 to 30, and the total number of disc reactors in the high viscosity zone is 8 to 12.

4. The high-viscosity PBT polymerization reactor according to claim 1, wherein, the length of the low viscosity zone is half of the length of the high-viscosity PBT polymerization reactor, and the total length of the med-high viscosity zone and the high viscosity zone is half of the length of the high-viscosity PBT polymerization reactor; the ratio of the length of the med-high viscosity zone to that of the high viscosity zone is 2:1.

5. The high-viscosity PBT polymerization reactor according to claim 1, wherein, the length of the agitating shaft disposed in the low viscosity zone and part of the med-high viscosity zone is two thirds of the length of the high-viscosity PBT polymerization reactor, and the length of the agitating shaft disposed in the high viscosity zone and the remaining med-high viscosity zone is one third of the length of the high-viscosity PBT polymerization reactor; and/or, the high-viscosity PBT polymerization reactor further comprises a prepolymer inlet located at the bottom of the front end of the low viscosity zone and a high-viscosity PBT melt outlet located at the bottom of the rear end of the high viscosity zone, wherein the high-viscosity PBT melt outlet is trumpet-shaped.

6. The high-viscosity PBT polymerization reactor according to claim 1, wherein, in the two-disc combination of the med-high viscosity zone, the distances between the disc combinations and between their two discs in each combination gradually increases from front to rear; the diameter of the disc reactors in the high viscosity zone decreases from front to rear, and the diameter of the last disc reactor in the high viscosity zone is 88%-92% of the diameter of the first disc reactor in the high viscosity zone; the high viscosity zone is further provided with a composite scraper, which comprises an axial scraper for scraping off the melt on the agitating shaft, a wall scraper for scraping off the melt on the inner wall of the high-viscosity PBT polymerization reactor, a disc scraper for scraping off the melt on the disc reactors, and a bottom scraper, the disc scraper being arranged in two layers and controlling the thickness of the material on the disc reactors to not exceed 30 mm.

7. A method for preparing a high-viscosity PBT/low-viscosity PET two-component elastic fiber, the two-component elastic fiber containing a high-viscosity PBT component and a low-viscosity PET component, the viscosity of the high-viscosity PBT component being greater than that of the low-viscosity PET component, wherein, the preparation method comprises steps of preparing a high-viscosity PBT melt and a low-viscosity PET melt separately, and spinning the high-viscosity PBT melt and the low-viscosity PET melt through the same parallel composite spinning assembly to obtain the two-component elastic fiber; the viscosity of the high-viscosity PBT melt is greater than the viscosity of the low-viscosity PET melt; the step of preparing a high-viscosity PBT melt comprises sequentially passing terephthalic acid and 1,4-butanediol through a first esterification reactor and a second esterification reactor for esterification reactions, through a first prepolymerization reactor and a second prepolymerization reactor for prepolymerization reactions to give a PBT prepolymer, and polymerizing the PBT prepolymer in the high-viscosity PBT polymerization reactor according to claim 1 to obtain the high-viscosity PBT melt; the step of preparing low-viscosity PET melt comprises sequentially passing terephthalic acid and ethylene glycol through a first esterification reactor and a second esterification reactor for esterification reactions, through a first prepolymerization reactor and a second prepolymerization reactor for prepolymerization reactions to give a PET prepolymer, and polymerizing the PET prepolymer in a low-viscosity PET final polymerization reactor to obtain the low-viscosity PET melt.

8. The preparation method according to claim 7, wherein, in percent by weight, the two-component elastic fiber contains 30%-70% of high-viscosity PBT component and 70%-30% of low-viscosity PET component; and/or, the high-viscosity PBT melt has an intrinsic viscosity of 0.98 to 1.20, and a dynamic viscosity of 225 to 615 Pa·s; the low-viscosity PET melt has an intrinsic viscosity of 0.45 to 0.55, and a dynamic viscosity of 90 to 240 Pa·s.

9. The preparation method according to claim 7, wherein, in the same parallel composite spinning assembly, the high-viscosity PBT melt has a dynamic viscosity of 200 to 520 Pa·s, and the low-viscosity PET melt has a dynamic viscosity of 70 to 220 Pa·s.

10. The preparation method according to claim 7, wherein, when preparing the high-viscosity PBT melt, the preparation method further comprises a step of adding an esterification catalyst to the first esterification reactor before carrying out the esterification reaction, wherein the esterification catalyst is selected from the group consisting of tetrabutyl titanate, tetraisopropyl titanate, and tetra (2-ethylhexyloxy) titanate.

11. The preparation method according to claim 7, wherein, the esterification reaction in the first esterification reactor used for preparing the high-viscosity PBT melt is carried out at a pressure of 40 to 60 kPa; and/or, the esterification reaction in the second esterification reactor used for preparing the high-viscosity PBT melt is carried out at atmospheric pressure; and/or, the second esterification reactor used for preparing the high-viscosity PBT melt is a horizontal reactor and comprises three compartments arranged in sequence from front to rear, and when preparing the high-viscosity PBT melt, the preparation method further comprises a step of adding a side reaction inhibitor to the first compartment from front to rear of the second esterification reactor, the side reaction inhibitor is a Lewis base.

12. The preparation method according to claim 11, wherein, the Lewis base is selected from the group consisting of triethanolamine, quaternary ammonium salts, ethylenediaminetetraacetic acid, sodium acetate, sodium benzoate, sodium formate, potassium succinate, lithium acetate, zinc acetate, and combinations thereof; and/or, the mass of the Lewis base is 30-300 ppm of the mass of the high-viscosity PBT melt.

13. The preparation method according to claim 11, wherein, when preparing the high-viscosity PBT melt, the preparation method further comprises a step of injecting a polymerization catalyst to the third compartment from front to rear of the second esterification reactor.

14. The preparation method according to claim 13, wherein, the polymerization catalyst is prepared by reacting a titanate with a protonic acid under anhydrous conditions, removing alcohol by-products, and dissolving the reaction system in 1,4-butanediol.

15. The preparation method according to claim 14, wherein, the titanate is selected from the group consisting of tetrabutyl titanate, tetraisopropyl titanate, and tetra (2-ethylhexyloxy) titanate; and/or, the protonic acid is selected from the group consisting of formic acid, acetic acid, propionic acid, oxalic acid, malonic acid, succinic acid, citric acid, tripolyphosphoric acid, polyphosphoric acid, and combinations thereof; and/or, the mass ratio of the titanate to the protonic acid is 1:(0.5-2.0); and/or, the mass percentage of titanium element in the polymerization catalyst is 1.0%-3.0%.

16. The preparation method according to claim 15, wherein, the mass of titanium element in the esterification catalyst accounts for 30 to 40 ppm of the mass of the high-viscosity PBT melt; and/or, the mass of titanium element in the polymerization catalyst accounts for 30 to 80 ppm of the mass of the high-viscosity PBT melt.

17. The preparation method according to claim 7, wherein, the low-viscosity PET final polymerization reactor is a horizontal polymerization reactor, and the length-to-diameter ratio thereof is (2.2-2.8):1.0.

18. The preparation method according to claim 7, wherein, the molar ratio of terephthalic acid to 1,4-butanediol is 1:(1.05-1.65); and/or, the esterification reaction in the first esterification reactor used for preparing the high-viscosity PBT melt is carried out at 245° C. to 247° C.

19. The high-viscosity PBT polymerization reactor according to claim 1, wherein the homogenizers are uniformly distributed along the circumferential direction of the disc reactors.

* * * * *